United States Patent [19]

Windecker

[11] 4,232,069
[45] Nov. 4, 1980

[54] IMPACT RESISTANT COMPOSITE STRUCTURE

[75] Inventor: Leo J. Windecker, Midland, Tex.

[73] Assignee: International Harvester Company, Chicago, Ill.

[21] Appl. No.: 30,208

[22] Filed: Apr. 16, 1979

[51] Int. Cl.² ............................ B32B 3/10; B32B 3/14
[52] U.S. Cl. ........................................ 428/47; 428/49; 428/325; 428/327
[58] Field of Search ............... 428/47, 44, 49, 327, 428/325

[56] References Cited

U.S. PATENT DOCUMENTS

| | | | |
|---|---|---|---|
| 2,723,214 | 11/1955 | Meyer | 428/49 |
| 3,509,833 | 5/1970 | Cook | 428/44 X |
| 3,516,898 | 6/1970 | Cook | 428/49 |
| 3,924,038 | 12/1975 | McArdle et al. | 428/49 |
| 4,016,326 | 4/1977 | Schaefer | 428/327 X |
| 4,030,427 | 6/1977 | Goldstein | 428/49 X |
| 4,042,743 | 8/1977 | Larson | 428/327 X |

*Primary Examiner*—Thomas J. Herbert, Jr.
*Attorney, Agent, or Firm*—John P. O'Brien; David F. AuBuchon

[57] ABSTRACT

An impact resistant composite structure is constructed of a facing portion designed to blunt and fragment an armor piercing-type bullet and absorbs some of the bullet's impact force, and a base layer designed to absorb and contain the remaining impact force of the bullet fragments. The facing layer includes a plurality of closely spaced ceramic tiles embedded in an adhesive elastic resin having a suspended mixture of polymeric microspheres, which isolate each of the ceramic tiles.

6 Claims, No Drawings

IMPACT RESISTANT COMPOSITE STRUCTURE

BACKGROUND OF THE INVENTION

This invention relates to an impact resistant composite structure that is light in weight, thin in its thickness dimension, and capable of stopping a high speed armor piercing type bullet.

In recent years there has been great interest in developing a light weight and relatively thin composite structure that can stop an armor piercing-type bullet. In U.S. Pat. Nos. 3,509,833 and 3,516,898, which both issued to R. L. Cook, there is disclosed a composite structure which was developed for this purpose. In both of the Cook patents the use of ceramic facings is used to blunt and shatter the oncoming bullet.

It is further disclosed in the Cook patents that the ceramic layer tends to fracture in an expanding conical shape from the point of impact of the bullet. In U.S. Pat. No. 3,509,833, it is suggested that this shattering can be somewhat localized by using a plurality of spaced tiles rather than a continuous tile layer.

In developing this invention, it was found that the use of small spaced tiles in the manner disclosed by the Cook patents did not satisfactorily cure the shattering of adjacent non-contacted tiles, which is caused by a bullet's lateral shock wave. As a consequence, subsequent rounds of bullets, when fired into the general area, would pass through the sample. This invention greatly reduces the lateral shock wave impact of a bullet on non-contacted tiles by isolating each tile in a shock absorbing manner.

SUMMARY OF THE INVENTION

An impact resistant composite structure constructed in accordance with the principles of this invention comprises a base portion having a plurality of layers of high tensile strength fibrous sheets impregnated with an adhesive elastic resin and a facing portion having a plurality of closely spaced tiles of a Rockwell hardness of thirty, embedded in a layer of adhesive elastic resin which contains a suspended mixture of polymeric microspheres of more than 2 percent in weight.

DESCRIPTION OF THE PREFERRED EMBODIMENT

The object of this invention is to provide an impact resistant composite structure that is light in weight, thin in its thickness dimension and capable of stopping a high speed armor piercing-type bullet. In the early stages of developing this invention, composite structure samples were made using multiple layers of aramid woven fiber sheets saturated with an adhesive elastic resin. The aramid woven fiber sheets are commercially available from such companies as DuPont & Company and are constructed of aromatic polyamides. Test results showed that the armor piercing-type bullets passed directly through these samples when the specimen was 1.25 inches thick.

In a later series of tests a layer of spaced ceramic tiles was added to the above described composite structure for the purpose of blunting and shattering an armor piercing-type bullet. In test of the samples having a ceramic tile layer embedded in an adhesive elastic resin, it was discovered that the shock wave of the bullet destroyed the structural integrity of all ceramic tiles surrounding the impact area so that subsequent bullets entering around the previous area of impact penetrated through the sample.

In later experimentation using the ceramic tiles, it was discovered that the effects of the bullet's lateral shock wave on non-contacted adjacent ceramic tiles could be substantially reduced by adding a very low percent in weight of polymeric microspheres to the adhesive elastic resin layer in which the tiles were embedded.

Based on the above discoveries and principles, my preferred embodiment is constructed as follows. A base portion for the impact resistant composite structure is constructed of a plurality of layers of a high tensile strength fiber sheets impregnated with an adhesive elastic resin. The purpose of the base portion is to absorb all the remaining energy of the bullet passing through the facing portion. This energy absorption is accomplished by the elongation of resin-coated fibers and the successive delamination of each layer of the high tensile strength fiber sheets.

To provide further elasticity and energy absorption characteristics to the base portion, some of the layers of the high tensile strength fiber sheets can be impregnated with a mixture of an adhesive elastic resin and a suspended mixture of polymeric microspheres.

A facing portion is constructed on the base portion, which comprises embedding a plurality of closely spaced tiles in a thick layer of an adhesive elastic resin having a suspended mixture of microspheres. The tiles are arranged in a plane generally parallel to the base portion.

The cross sectional area of the tiles is selected to be in the range of ten to twenty times the cross sectional area of a bullet and the spacing between adjacent tiles should be less than the diameter of a bullet to insure that a bullet always contacts at least one tile.

The hardness of the tiles must be selected to blunt and fragment a bullet. Experimentation has shown that each tile must have a Rockwell hardness of at least thirty. Materials suitable for this purpose include: compressed aggregates of carborundum; sand which is embedded or fuzed in a resin matrix; high modular metals such as hardened steel or cast iron; and ceramic materials having a high alumina content.

The use of the tiles of a hardened materials embedded in the layer of adhesive elastic resin will successfully blunt and shatter an armor piercing-type bullet upon impact. The lateral shock wave created by the bullet will shatter all the adjacent tiles with the ditrimental result that succeeding rounds of bullets shot into the same general area will pass through the impact resistant composite structure. The use of a very low percent in weight mixture of microspheres with the adhesive elastic resin has been found to have the desirable effect of isolating the spaced ceramic tiles from each other such that a bullet shot into the sample shatters only the ceramic tile it comes into direct contact. To provide adequate isolation the quantity of polymeric microspheres must be at least 2 percent in weight relative to the quantity of the adhesive elastic resin.

To provide the greatest isolation of each tile, the tiles are preferably embedded in the center of a thick layer of an adhesive elastic layer having a suspended mixture of microspheres. The thickness of this adhesive elastic layer is preferably three times the thickness of the tiles to provide parallel shunt paths in front and behind each tile for carrying the lateral shock wave of the bullet. By supporting the tiles in this isolated arrangement, the lateral shock wave of a bullet is transmitted through a visoelastic interface between and surrounding the individual tiles.

The outer surface of the facing portion is formed by a plurality of layers of high tensile strength fibrous sheets impregnated with an adhesive resin. This plurality of fibrous sheets is bonded to the thick layer of adhesive elastic resin that carries the spaced tiles. The primary purpose of this outer surface is to constrain the tiles from dislocation as the result of a bullet penetrating the impact resistant composite structure. The outer surface serves the secondary purpose of absorbing some of the bullet's energy and thereby reducing its force of impact delivered to the rest of the facing portion.

One of the successful samples that incorporated the principles of my invention was constructed as follows. The base portion was started by laying up 5 ply of KELVAR aramid fibers which had been previously wetted by 8084 DERAKANE adhesive elastic resin (manufactured by Dow Chemical Company) that contained a suspended mixture of 3 percent SARAN polymeric microspheres. The SARAN polymeric microspheres are manufactured by the Dow Chemical Company from polyvinylidene chloride in the form of gas-filled microbaloons of varying diameters in the range of 10 to 100 microns. To complete the base portion, 15 ply of KELVAR aramid fibers which had been wetted by 8084 DERAKANE resin was placed on top of the 5 ply KEVLAR fibers.

The facing portion was constructed by mixing 3 percent SARAN polymeric microspheres in weight with a formulation of 8084 DERAKANE adhesive elastic resin. Ten ply of this mixture was placed on top of the base portion prior to the cure of the resin in the base portion. A plurality of ceramic tiles (having dimensions of 0.925 in.×0.925 in.×0.195 in.) were then laid on top of the ten ply mixture and gently worked into the resin formulation such that the spacing between the adjacent tiles was set approximately one-eighth inch.

After the tiles were installed, another ten ply of the DERAKANE resin formulation with 3 percent SARAN microspheres was added. Finally, a facing surface was formed by adding 2 ply of KEVLAR aramid fibrous sheets wetted with the 8084 DERAKANE resin.

One square foot of the above sample weighed 8.6 pounds and was 1.25 inches thick. Four rounds of an M-80 armor piercing bullet were fired into this sample at 40 meters. The sample contained the first three bullets; the fourth bullet penetrated through the sample. This test demonstrated the effectiveness of isolating the tiles using a suspended mixture of polymeric microspheres in the adhesive elastic resin.

What is claimed is:

1. An impact resistant composite structure comprising:
    (a) a base portion having a plurality of plys of high tensile strength fibrous sheets impregnated with an adhesive elastic resin;
    (b) a facing portion bonded to said base portion and comprising a plurality of closely spaced tiles having a Rockwell hardness of thirty and embedded in a layer of adhesive elastic resin having a suspended mixture of polymeric microspheres of more than 2 percent in weight relative to the quantity of adhesive elastic resin, said layer of said adhesive elastic resin being at least three times the thickness of said tiles and said tiles being mounted in a plane that generally extends along the centerline of said adhesive elastic resin; and
    (c) said facing portion including a facing surface having a plurality of layers of high tensile strength fibrous sheets impregnated with an adhesive elastic resin.

2. An impact resistant composite structure as defined in claim 1, wherein said high tensile strength fibrous sheets of both said base portion and said facing surface are made from aramid fibers.

3. An impact resistant composite sheet as defined in claim 1, wherein said base portion on its bottom side includes another plurality of plys of high tensile strength fibrous sheets impregnated with an adhesive elastic resin containing a suspended mixture of polymeric microspheres of more than 2 percent in weight relative to the quantity of said adhesive elastic resin.

4. An impact resistant composite structure comprising:
    (a) a base portion having a plurality of plys of high tensile strength fibrous sheets impregnated with an adhesive elastic resin;
    (b) a facing portion bonded to said base portion and comprising a plurality of spaced ceramic tiles embedded in a layer of adhesive elastic resin having a suspended mixture of microspheres of more than 2 percent in weight relative to the quantity of the adhesive elastic resin, said layer of said adhesive lastic resin being at least three times the thickness of said tiles and said tiles being mounted in a plane that extends generally along the centerline of said adhesive elastic resin; and
    (c) said facing portion including a facing surface having a plurality of layers of high tensile strength fibrous sheets impregnated with an adhesive elastic resin.

5. An impact resistant composite structure as defined in claim 4, wherein said high tensile strength sheets of both said base portion and said facing surface are made from aramid fibers.

6. An impact resistant composite sheet as defined in claim 4, wherein said base portion on its bottom side includes another plurality of layers of high tensile strength fibrous sheets impregnated with an adhesive elastic resin containing a suspended mixture of microspheres of more than 2 percent in weight relative to the quantity of said adhesive elastic resin.

* * * * *